Figure 1:
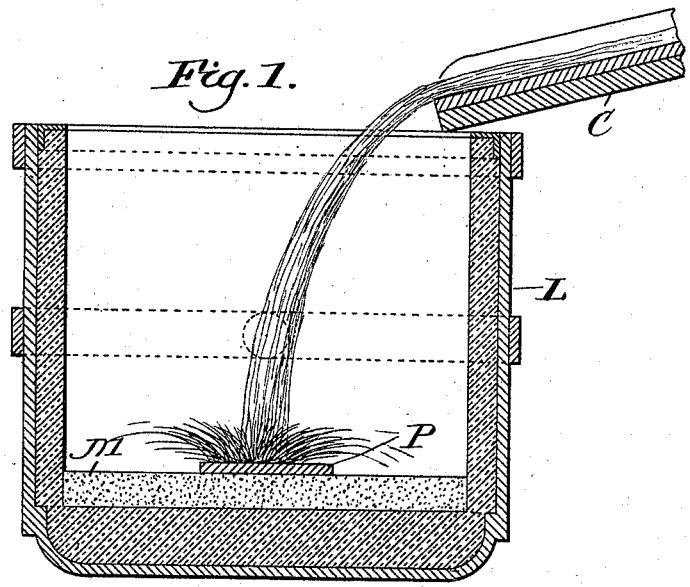

(No Model.)

E. H. SANITER.
PROCESS OF PURIFYING IRON.

No. 581,943.   Patented May 4, 1897.

Witnesses:
A. C. Harwood
Edward F. Allen.

Inventor:
Ernest H. Saniter.
by Crosby Gregory attys.

UNITED STATES PATENT OFFICE.

ERNEST H. SANITER, OF WIGAN, ENGLAND.

PROCESS OF PURIFYING IRON.

SPECIFICATION forming part of Letters Patent No. 581,943, dated May 4, 1897.

Application filed December 4, 1896. Serial No. 614,403. (No specimens.) Patented in Belgium January 21, 1892, No. 98,005; in England May 6, 1892, No. 8,612^A; in France July 13, 1892, No. 222,976; in Luxemburg August 6, 1892, No. 1,666, and in Austria-Hungary January 21, 1893, No. 52,443 and No. 80,445.

*To all whom it may concern:*

Be it known that I, ERNEST H. SANITER, a subject of the Queen of Great Britain, residing at Wigan, in the county of Lancaster, England, have invented certain new and useful Improvements in the Purification of Iron, (for which I have received Letters Patent in England, No. 8,612^A, dated May 6, 1892; in Belgium, No. 98,005, dated January 21, 1892; in France, No. 222,976, dated July 13, 1892; in Luxemburg, No. 1,666, dated August 6, 1892, and in Austria-Hungary, No. 52,443 and No. 80,445, dated January 21, 1893,) of which the following description, in connection with the accompanying drawings, is a specification, like letters on the drawings representing like parts.

This invention has for its object the purification of liquid cast-iron by the elimination of sulfur therefrom without materially decarburizing it and without converting the cast-iron into steel; and to this end my process consists in bringing the molten cast-iron into contact with an alkaline earth and a haloid salt of an alkaline-earth metal without decarburizing the iron, substantially in the manner hereinafter described.

I have discovered that highly beneficial results are obtained with a mixture of chlorid or fluorid of calcium and carbonate, hydrate, or oxid of calcium.

In working the process I do not confine myself to the calcium compounds above mentioned, as it may sometimes be advantageous for cheapness to use such compounds as would be converted into chlorid or fluorid of calcium by mixing with the lime and heating. For the same reason magnesian limestone or lime may sometimes be used instead of ordinary limestone or lime.

The several alkaline earths and the hydrates and carbonates are equivalents for the purposes of this process.

I find the following mixture to be very efficient: a haloid salt of an alkaline-earth metal, such as chlorid of calcium, ($CaCl_2$,) eighteen pounds; lime, fourteen pounds; limestone, eleven pounds.

The above is the quantity required for one ton of molten iron.

I do not confine myself to the above mixture, the proportions or weights of which may be varied according to the quality and temperature of the molten iron and the time required for filling the ladle—as, for instance, if the iron is cold and very high in sulfur.

The mixture is made more fusible by adding one pound more of the haloid salt and one-third more of the mixture per ton of iron to be treated.

Again, if the iron is very hot or a very large ladle taking a long time to fill is used, it will be necessary to reduce the quantity of haloid salt by a pound or two and substitute a few pounds of limestone by its equivalent of lime, as by this means the mixture is made less fusible and also to dissolve more slowly.

Thus lime and limestone can be interchanged in accordance with the above examples.

Figure 2:
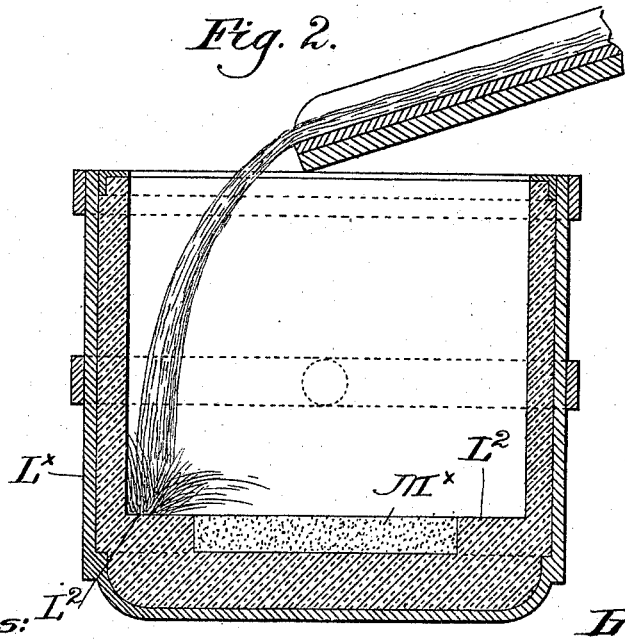

Figure 1, in a vertical section, represents a ladle with the mixture placed therein for carrying out my process; and Fig. 2 is a similar view of a modification in the manner of locating the mixture in the ladle.

The materials are ground together to bring them to a fine powder and mix them thoroughly. This mixture M is then placed on the bottom of an ordinary ladle or other suitable receiving-vessel L, Fig. 1, and pressed well down. A small cast-iron plate P is placed on the mixture in such a position that when the cast-iron is run in it strikes the plate and thus does not disturb the mixture, or, as shown in Fig. 2, the ladle $L^\times$ can be formed with a well in the bottom, say, twelve inches deep. This well can be formed by bricking up the surrounding space, as at $L^2$, and the well is then filled with the mixture $M^\times$. In filling the ladle the molten metal can be poured on the step of brickwork thus formed. In this way the metal flows over without disturbing the mixture. The molten cast-iron is now run into the ladle direct from the blast-furnace or other melting-furnace by or through a chute or runner C, care being taken to keep out the slag. The heat of the molten cast-iron now gradually melts the mixture at the bottom of the ladle, which, rising through the metal, removes the sulfur, the time occupied being about twenty minutes. The molten iron is then ready to be utilized as required.

A tipping-ladle of a deep form is the most suitable for efficient work.

The advantages of the process will be readily understood, as by its means sulfury iron direct from the blast-furnace can be rendered suitable for steel-making at a very small cost and without expensive plant.

Many thousands of tons have been treated in England in this way, the elimination of sulfur being on an average seventy per cent.

The ladle may be lined with either acid, basic, or neutral material.

I have not been able to ascertain the exact reactions which take place, but it would appear that a sub or oxy chlorid or fluorid of calcium, according to the haloid salt used, is formed with the lime, and which, being more readily decomposable than lime, allows the nascent calcium to attack the sulfid of iron, the excess of lime maintaining the stability of the calcium sulfid when formed.

The process hereinbefore described is for the desulfurizing of molten cast-iron without decarburizing the same, thereby producing pure cast-iron, and I therefore disclaim its use during the conversion of molten cast-iron into steel.

The conversion of the cast-iron into steel is purposely avoided, as I thereby avoid the oxidizing conditions necessary for the removal of the carbon from the iron, which conditions are in themselves strongly opposed to the elimination or removal of sulfur.

In so far as my present invention is concerned the carbonates of the alkaline earths are, for the purposes of the process, the equivalents of the earths themselves, for the reason that in the operation of the process these carbonates are immediately and spontaneously converted into those earths by the expulsion of their carbonic acid, and accordingly by the term "alkaline earths" I also include the carbonates of such earths.

Having fully described my invention, what I claim, and desire to secure by Letters Patent, is—

1. The herein-described process of making desulfurized cast-iron, which consists in bringing the molten cast-iron into contact with an alkaline earth and a haloid salt of an alkaline-earth metal in a loose or comminuted state in the purifying vessel, without decarburizing the iron, substantially as described.

2. The herein-described process of making desulfurized cast-iron, which consists in bringing the molten cast-iron into contact with an alkaline earth and a haloid salt of calcium, without decarburizing the iron, said earth and salt of calcium being in a loose or comminuted state in the purifying vessel, substantially as described.

3. The herein-described process of making desulfurized cast-iron, which consists in bringing the molten cast-iron into contact with an alkaline earth and chlorid of calcium, without decarburizing the iron, substantially as described.

4. The herein-described process of making desulfurized cast-iron, which consists in bringing the molten cast-iron into contact with lime and a haloid salt of calcium without decarburizing the iron, said lime and salt of calcium being in a loose or comminuted state in the purifying vessel, substantially as described.

5. The herein-described process of making desulfurized cast-iron, which consists in bringing the molten cast-iron into contact with lime and chlorid of calcium, without decarburizing the iron, substantially as described.

6. The herein-described process of making desulfurized cast-iron, which consists in bringing the molten cast-iron into contact with a mixture of an alkaline earth and a haloid salt of an alkaline-earth metal, and liquefying the mixture by the heat of the molten cast-iron, without decarburizing the latter, substantially as described.

In testimony whereof I have signed my name to this specification in the presence of two subscribing witnesses.

ERNEST H. SANITER.

Witnesses:
W. H. BEESTON,
ROBT. NICHOLSON.